United States Patent
Uchida et al.

(10) Patent No.: US 9,729,206 B2
(45) Date of Patent: Aug. 8, 2017

(54) POWER TRANSMISSION DEVICE AND POWER TRANSMISSION-RECEPTION SYSTEM

(71) Applicant: FUJITSU LIMITED, Kawasaki-shi, Kanagawa (JP)

(72) Inventors: Akiyoshi Uchida, Akashi (JP); Seiichi Kamon, Kakogawa (JP); Kiyotaka Tanaka, Kakogawa (JP); Masunari Tamesue, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 400 days.

(21) Appl. No.: 14/496,031

(22) Filed: Sep. 25, 2014

(65) Prior Publication Data
US 2015/0028673 A1    Jan. 29, 2015

Related U.S. Application Data

(63) Continuation of application No. PCT/JP2012/058649, filed on Mar. 30, 2012.

(51) Int. Cl.
*H01F 38/14* (2006.01)
*H02J 5/00* (2016.01)
(Continued)

(52) U.S. Cl.
CPC .......... *H04B 5/0037* (2013.01); *H01F 38/14* (2013.01); *H02J 5/005* (2013.01); *H02J 7/025* (2013.01); *Y10T 307/406* (2015.04)

(58) Field of Classification Search
None
See application file for complete search history.

(56) References Cited

U.S. PATENT DOCUMENTS

| 2009/0264069 A1 | 10/2009 | Yamasuge |
| 2009/0281678 A1 | 11/2009 | Wakamatsu |

(Continued)

FOREIGN PATENT DOCUMENTS

| CN | 102027685 A | 4/2011 |
| JP | 2008-283789 A1 | 11/2008 |

(Continued)

OTHER PUBLICATIONS

Office Action of Chinese Patent Application 201280071917.X dated Feb. 2, 2016, with full translation of the Office Action.
(Continued)

*Primary Examiner* — Jared Fureman
*Assistant Examiner* — Aqeel Bukhari
(74) *Attorney, Agent, or Firm* — Kratz, Quintos & Hanson, LLP

(57) ABSTRACT

A power transmission device has: a power transmission unit configured to perform wireless power transmission; a communication unit configured to perform wireless communication within a range wider than a power transmission possible range of the power transmission unit; and a power transmission control circuit configured to control power of wireless power transmission of the power transmission unit, wherein the power transmission control circuit controls the power of wireless power transmission of the power transmission unit according to a number of power reception devices for which the communication unit received a response indicating that power reception is performed from power reception devices receiving power equal to or more than a threshold when the power transmission unit performs power transmission by first power, and a number of power reception devices for which the communication unit received a response indicating that power reception is performed from power reception devices receiving power equal (Continued)

to or more than the threshold when the power transmission unit does not perform power transmission or performs power transmission by second power smaller than the first power.

10 Claims, 12 Drawing Sheets

(51) Int. Cl.
*H04B 5/00* (2006.01)
*H02J 7/02* (2016.01)

(56) References Cited

U.S. PATENT DOCUMENTS

| | | |
|---|---|---|
| 2009/0284082 A1 | 11/2009 | Mohammadian |
| 2011/0080051 A1 | 4/2011 | Lee et al. |
| 2011/0244913 A1 | 10/2011 | Kim et al. |
| 2011/0309688 A1 | 12/2011 | Yamazaki |
| 2012/0009869 A1 | 1/2012 | Suzuki et al. |
| 2012/0049644 A1 | 3/2012 | Choi et al. |
| 2013/0154558 A1* | 6/2013 | Lee ................ H04B 5/0037 320/108 |
| 2014/0028244 A1* | 1/2014 | Korekoda ........... B60L 11/1812 320/106 |

FOREIGN PATENT DOCUMENTS

| | | |
|---|---|---|
| JP | 2009-261157 A1 | 11/2009 |
| JP | 2009-278707 A1 | 11/2009 |
| JP | 2010-288327 A1 | 12/2010 |
| JP | 2011-199975 A1 | 10/2011 |
| JP | 2012-23950 A1 | 2/2012 |
| WO | 2009140216 A2 | 11/2009 |
| WO | WO 2010/093721 A1 | 8/2010 |

OTHER PUBLICATIONS

Office Action of Korean Patent Application 10-2014-7026872 dated Jun. 30, 2016; full translation of the Office Action.
Office Action of Chinese Patent Application 201280071917.X dated Jul. 12, 2016; translation of the relevant part, p. 11, the fifth line from the bottom to p. 12.
Supplementary European Search Report of European Patent Application 12872782.3 dated Mar. 19, 2015.
International Preliminary Report dated Oct. 1, 2014. International Application No. PCT/JP2012/058649.
International Search Report for International Application No. PCT/JP2012/058649 dated Dec. 11, 2012.
Office Action of Mexican Patent Application MX/a/2014/0011564 dated Aug. 11, 2015, with full translation of the Office Action.

* cited by examiner

F I G. 1
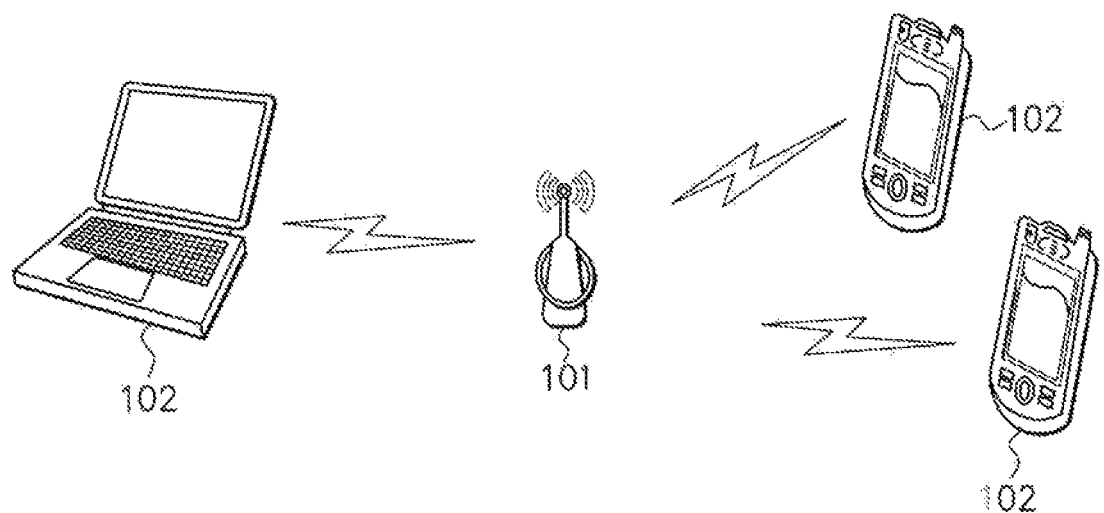

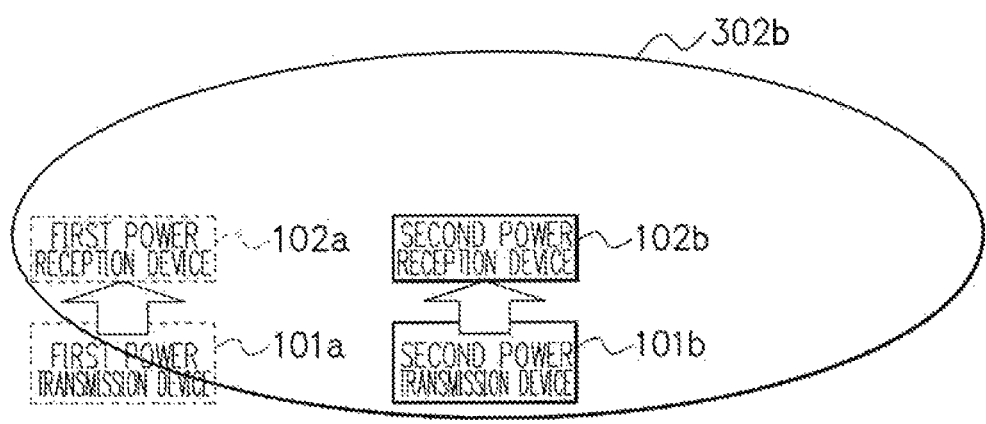
F I G. 4C

F I G. 11
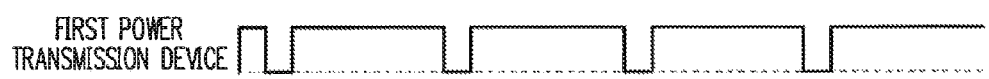
F I G. 12
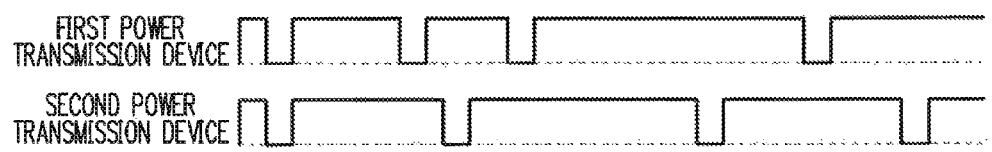
F I G. 13A
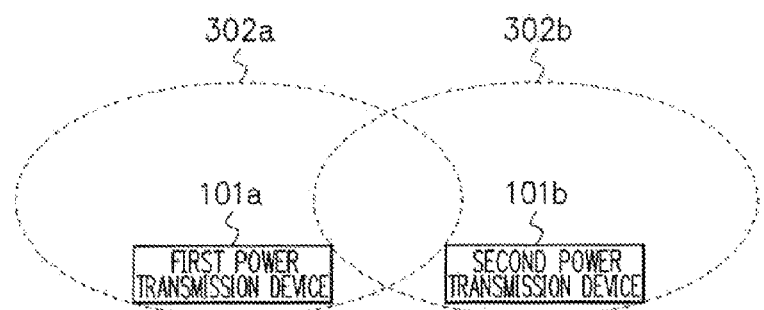

POWER TRANSMISSION DEVICE AND POWER TRANSMISSION-RECEPTION SYSTEM

CROSS-REFERENCE TO RELATED APPLICATION

This application is a continuation application of International Application PCT/JP2012/058649 filed on Mar. 30, 2012, and designated the U.S., the entire contents of which are incorporated herein by reference.

FIELD

The present invention relates to a power transmission device and a power transmission-reception system.

BACKGROUND

Non-contact power supply technology represented by electromagnetic induction has been studied. The non-contact power supply technology is used in, for example, a shaver or an electric tooth brush. In recent years, with introduction of magnetic field resonance technology as a cue, non-contact power supply is actively developed again.

Further, there has been known a wireless power supply system transmitting power to a power reception antenna from a power transmission antenna by wireless method, the wireless power supply system having a detection unit detecting information related to a disposition state of the power reception antenna, plural driving units separately driving plural power transmission coils of the power reception antennas, and a control unit controlling current flowing through the power transmission coils via the driving units based on at least the information related to the disposition state of the power reception antenna (see, for example, Patent Literature 1).

Further, there has been known a non-contact power transmission device having N (N is an integer of 2 or larger) power transmission circuits and a control means controlling this N power transmission circuits, is which the power transmission circuits have a power transmission side LC tank circuit constituted of serially connected capacitors and a power transmission coil, and an oscillation circuit supplying power to this power transmission side LC tank circuit, the power transmission coils of the N-power transmission circuits are disposed in a matrix form, and the control means controls a phase of a signal generated by each oscillation circuit of the N power transmission circuits so that phases of changes of magnetic fields coming from at least two power transmission coils among the power transmission coils of the N power transmission circuits align in a power reception coil of a power reception circuit (see, for example, Patent Literature 2).

Patent Literature 1: Japanese Laid-open Patent Publication No. 2008-283789
Patent Literature 2: Japanese Laid-open Patent Publication No. 2011-199975

SUMMARY

A power transmission device has: a power transmission unit configured to perform wireless power transmission; a communication unit configured to perform wireless communication within a range wider than a power transmission possible range of the power transmission unit; and a power transmission control circuit configured to control power of wireless power transmission of the power transmission unit, wherein the power transmission control circuit controls the power of wireless power transmission of the power transmission unit according to a number of power reception devices for which the communication unit received a response indicating that power reception is performed from power reception devices receiving power equal to or more than a threshold when the power transmission unit performs power transmission by first power, and a number of power reception devices for which the communication unit received a response indicating that power reception is performed from power reception devices receiving power equal to or more than the threshold when the power transmission unit does not perform power transmission or performs power transmission by second power smaller than the first power.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a structural example of a power transmission-reception system according to a first embodiment.

FIG. 4C is a diagram for describing a method of detecting the number of power reception devices existing inside the power transmission possible range of the second power transmission device.

FIG. 11 is a time chart illustrating a power transmission example of a first power transmission device according to a third embodiment.

FIG. 12 is a time chart illustrating a power transmission example of the first power transmission device and the second power transmission device according to a fourth embodiment.

FIG. 13A is a diagram illustrating a processing example of the first power transmission device and the second power transmission device according to a fifth embodiment.

DESCRIPTION OF EMBODIMENTS

First Embodiment

FIG. 1 is a diagram illustrating a structural example of a power transmission-reception system according to a first embodiment. The power transmission-reception system has, for example, one power transmission device 101 and plural power reception devices 102. The plural power transmission device 101 can wirelessly transmit power to plural power reception devices 102. The plural power reception devices 102 are a personal computer, a mobile terminal or mobile phone, and the like for example, and can wirelessly receive power from the power transmission device 101 to charge an internal battery. Thus, the power transmission device 101 can simultaneously charge the plural power reception devices 102. At this time, the power transmission device 101 needs to perform wireless transmission by relatively small power when the number of power reception devices 102 receiving power is small, and to perform wireless transmission by relatively large power when the number of power reception devices 102 receiving power is large. If the power transmission device 101 performs wireless transmission by power larger than necessary when the number of power reception devices 102 is small, there occurs a problem that the power reception devices 102 receives power excessively and heat exceeding a tolerance value occurs. Therefore, the power transmission device 101 needs to control power of wireless transmission according to the number of power reception devices existing in a power transmission possible range.

Figure 2:
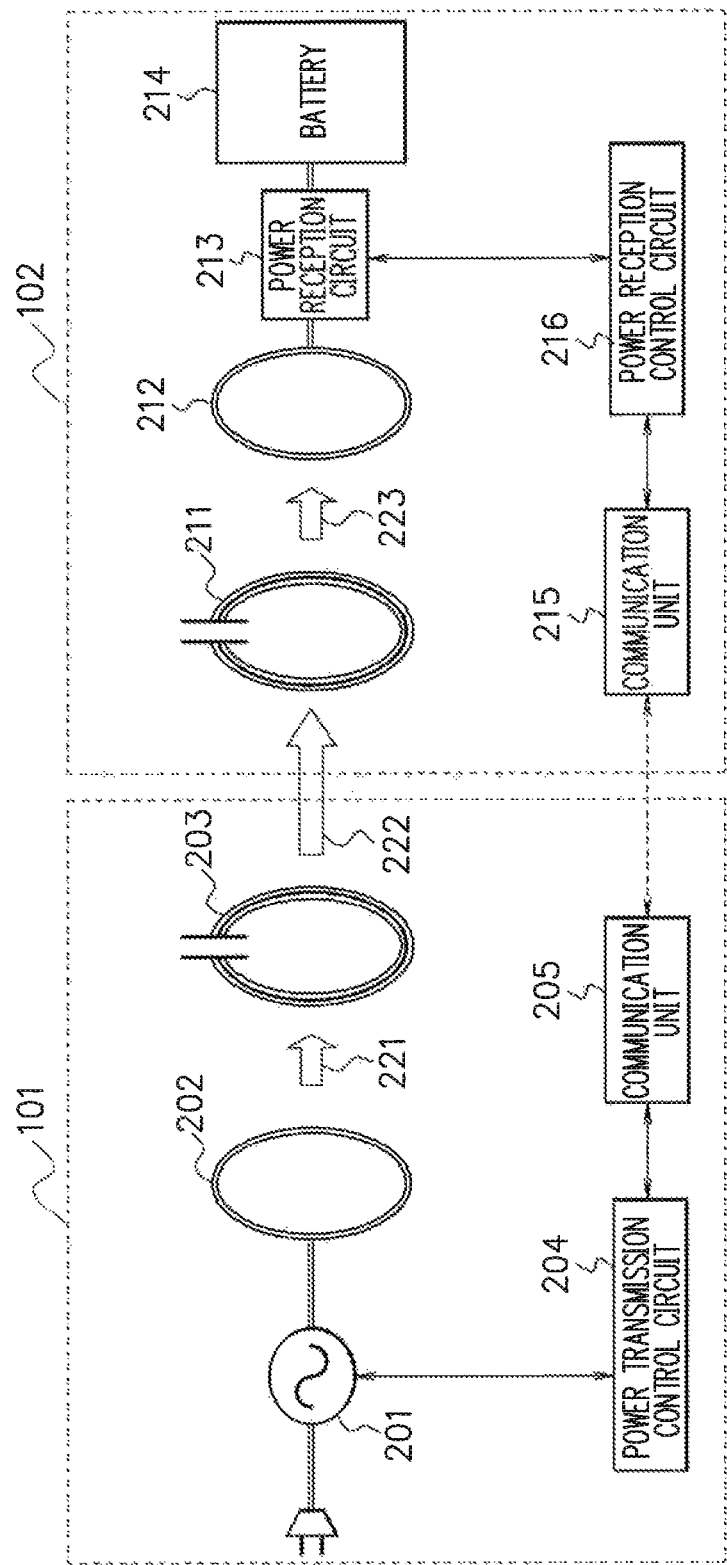
FIG. 2 is a diagram illustrating a structural example of a power transmission device and a power reception device.

FIG. 2 is a diagram illustrating a structural example of the power transmission device 101 and the power reception device 102. The power transmission device 101 has a high-frequency power supply circuit 201, a power transmission coil 202, a power transmission LC resonator 203, a power transmission control circuit 204, and a communication unit 205. The power reception devices 102 has a power reception LC resonator 211, a power reception coil 212, a power reception circuit 213, a battery 214, a communication unit 215, and a power reception control circuit 216. The LC resonators 203 and 211 are serially connected circuits of coils (inductors) and capacitors, and a resonance frequency thereof is $1/(2\times\pi\times\sqrt{(L\times C)})$. Here, L is inductance and C is capacitance value. The power transmission device 101 can perform wireless power transmission to the power reception device 102. The high-frequency power supply circuit 201 has an oscillator, an amplifier, and a matching circuit, and applies high-frequency voltage to the power transmission coil 202. Then, a magnetic field occurs in the power transmission coil 202, and current flows through the power transmission LC resonator 203 by electromagnetic induction 221. Since the frequency of voltage applied by the high-frequency power supply circuit 201 is the resonance frequency of $1/(2\times\pi\times\sqrt{(L\times C)})$, the power transmission LC resonator 203 becomes a resonance state. A magnetic field occurs in the power transmission LC resonator 203, current flows through the power reception LC resonator 211 by magnetic field resonance 222 of the resonance frequency of $1/(2\times\pi\times\sqrt{(L\times C)})$, and the power reception LC resonator 211 becomes a resonance state. Then, a magnetic field occurs in the power reception LC resonator 211, and current flows through the power reception coil 212 by electromagnetic induction 223. The power reception circuit 213 has a rectifying circuit, rectifies voltage occurring in the power reception coil 212, and supplies the rectified voltage to the battery 214. The battery 214 is charged by the supplied voltage. The power transmission device 101 can perform wireless power transmission to the power reception device 102 by the magnetic field resonance 222, to thereby charge the battery 214 of the power reception device 102.

The communication unit 205 of the power transmission device 101 and the communication unit 215 of the power reception device 102 are communication units for performing wireless communication by a method different from power transmission and reception by the coils 202, 212 and the LC resonators 203, 211 and can mutually perform transmission and reception. The power transmission control circuit 204 is connected to the communication unit 205 and controls the high-frequency power supply circuit 201. The power reception control circuit 216 is connected to the communication unit 215 and controls the power reception circuit 213.

Here, the power transmission coil 202 performs wireless power transmission to the power transmission LC resonator 203 by the electromagnetic induction 221. Next, the power transmission LC resonator 203 performs wireless power transmission to the power reception LC resonator 211 by magnetic field resonance 222. Next, the power reception LC resonator 211 performs wireless power transmission to the power reception coil 212 by electromagnetic induction 223. Thus, the power transmission device 101 can perform wireless transmission to the power reception devices 102 by the magnetic field resonance 222.

Note that, not limited to the magnetic field resonance 222, the power transmission device 101 can perform various types of wireless power transmission to the power reception device 102. The wireless transmission includes electromagnetic induction, electric field induction, electric field resonance, microwave power transmission, or laser power transmission besides the above magnetic filed resonance 222. In the case of the electromagnetic induction, for example, the LC resonators 203 and 211 may be deleted. In the case, the power transmission coil 202 of the power transmission device 101 can perform wireless power transmission to the power reception coil 212 of the power reception device 102 by electromagnetic induction. Further, in the case of the electric field induction or the electric field resonance, wireless power transmission can be performed from the power transmission device 101 to the power reception device 102 by using an antenna or the like. Hereinafter, the case where the power transmission device 101 performs wireless transmission to the power reception device 102 by the magnetic field resonance 222 will be described as an example.

Figure 3:
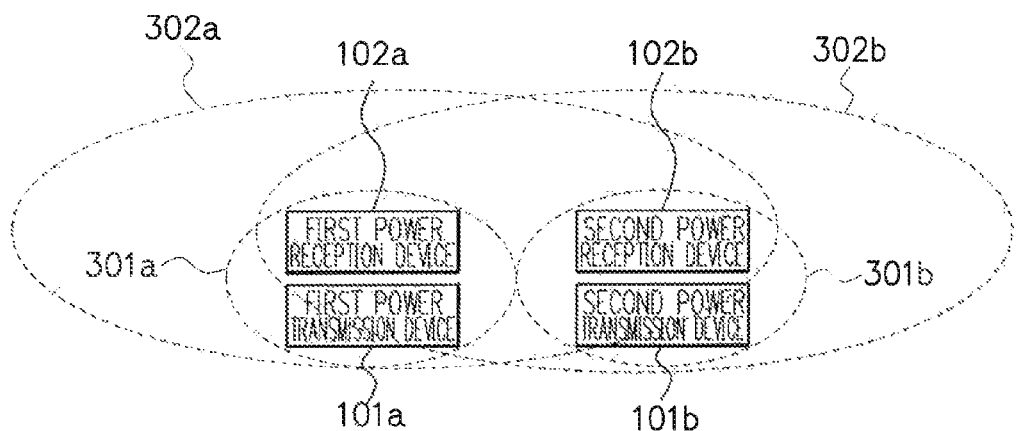
FIG. 3 is a diagram illustrating a structural example of a power transmission-reception system having two power transmission devices, and two power reception devices.

FIG. 3 is a diagram illustrating a structural example of a power transmission-reception system having two power transmission devices 101a, 101b and two power reception devices 102a, 102b. The power transmission devices 101a and 101b have the same structure as the power transmission device 101 of FIG. 2. The power reception devices 102a and 102b have the same structure as the power reception device 102 of FIG. 2.

A first power transmission possible range 301a is a range in which a power transmission unit (including the power transmission coil 202 and the power transmission LC resonator 203) of the first power transmission device 101a can perform wireless power transmission. A first transmission possible range 302a is a range in which the communication unit 205 of the first power transmission device 101a can perform wireless transmission and is wider than the first power transmission possible range 301a.

A second power transmission possible range 301b is a range in which a power transmission unit (including the power transmission coil 202 and the power transmission LC resonator 203) of the second power transmission device 101b can perform wireless power transmission. A second transmission possible range 302b is a range in which the communication unit 205 of the second power transmission device 101b can perform wireless transmission and is wider than the second power transmission possible range 301b.

For example, when the power transmission units of the power transmission devices 101a and 101b are power transmission units of magnetic field resonance method, the power transmission possible ranges 301a and 301b are about several tens of centimeters. Further, when the communication units 205 of the power transmission devices 101a and 101b are of communication method of Bluetooth (registered trademark), the transmission possible ranges 302a and 302b are several meters.

The first power transmission device 101a can perform power transmission to the first power reception device 102a located inside the first power transmission possible range 301a, but cannot perform power transmission to the second power reception device 102b located outside the first power transmission possible range 301a. The second power transmission device 101b can perform power transmission to the second power reception device 102b located inside the second power transmission possible range 301b, but cannot perform power transmission to the first power reception device 102a located outside the second power transmission possible range 301b.

Further, the first power transmission device 101a can perform transmission to the first power reception device 102a and the second power reception device 102b located inside the first transmission possible range 302a, but cannot perform transmission to a power reception device located outside the first transmission possible range 302a. The second power transmission device 101b can perform transmission to the first power reception device 102a and the second power reception device 102b located inside the second transmission possible range 302b, but cannot perform transmission to a power reception device located outside the second transmission possible range 302b.

As described above, a power transmission target of the first power transmission device 101a is only the first power reception device 102a, and a power transmission target of the second power transmission device 101b is only the second power reception device 102b.

On the other hand, transmission targets of the first power transmission device 101a are the first power reception device 102a and the second power reception device 102b, and transmission targets of the second power transmission device 101b are the first power reception device 102a and the second power reception device 102b.

The first transmission possible range 302a is wider than the first power transmission possible range 301a, and the second transmission possible range 302b is wider than the second power transmission possible range 301b. Accordingly, the number of power reception devices 102 as the power transmission target of the power transmission device 101 and the number of power reception devices 102 as the transmission targets of the power transmission device 101 do not match. Therefore, it is uneasy for the power transmission devices 101a and 101b to detect the number of power reception devices located inside the power transmission possible ranges 301a and 301b by only wireless communication of the communication units 205. A method will be described below by which the power transmission devices 101a and 101b detects the number of power reception devices 102 located inside the power transmission possible ranges 301a and 301b and perform transmission of appropriate power according to the number of detected power reception devices 102.

Figure 4A:
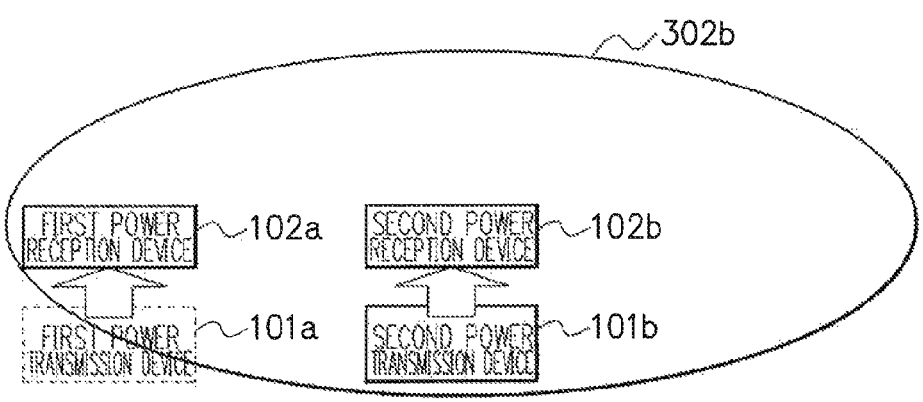
FIG. 4A is a diagram for describing a method of detecting the number of power reception devices existing inside the power transmission possible range of a second power transmission device.
Figure 4B:
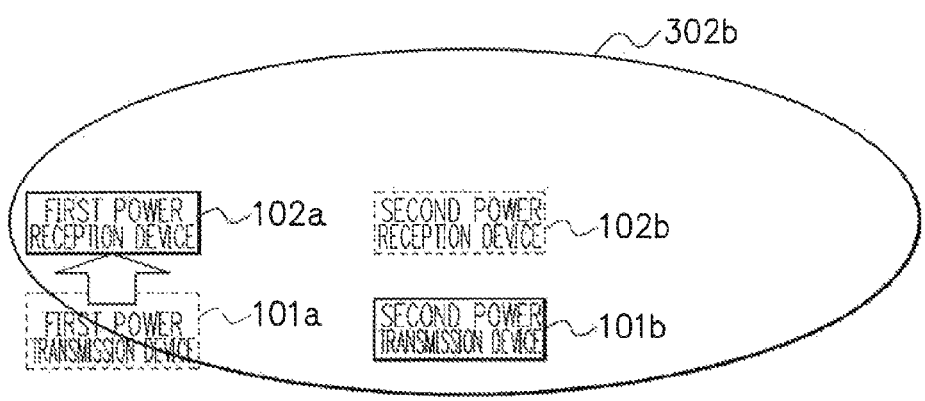
FIG. 4B is a diagram for describing a method of detecting the number of power reception devices existing inside the power transmission possible range of the second power transmission device.
Figure 5:
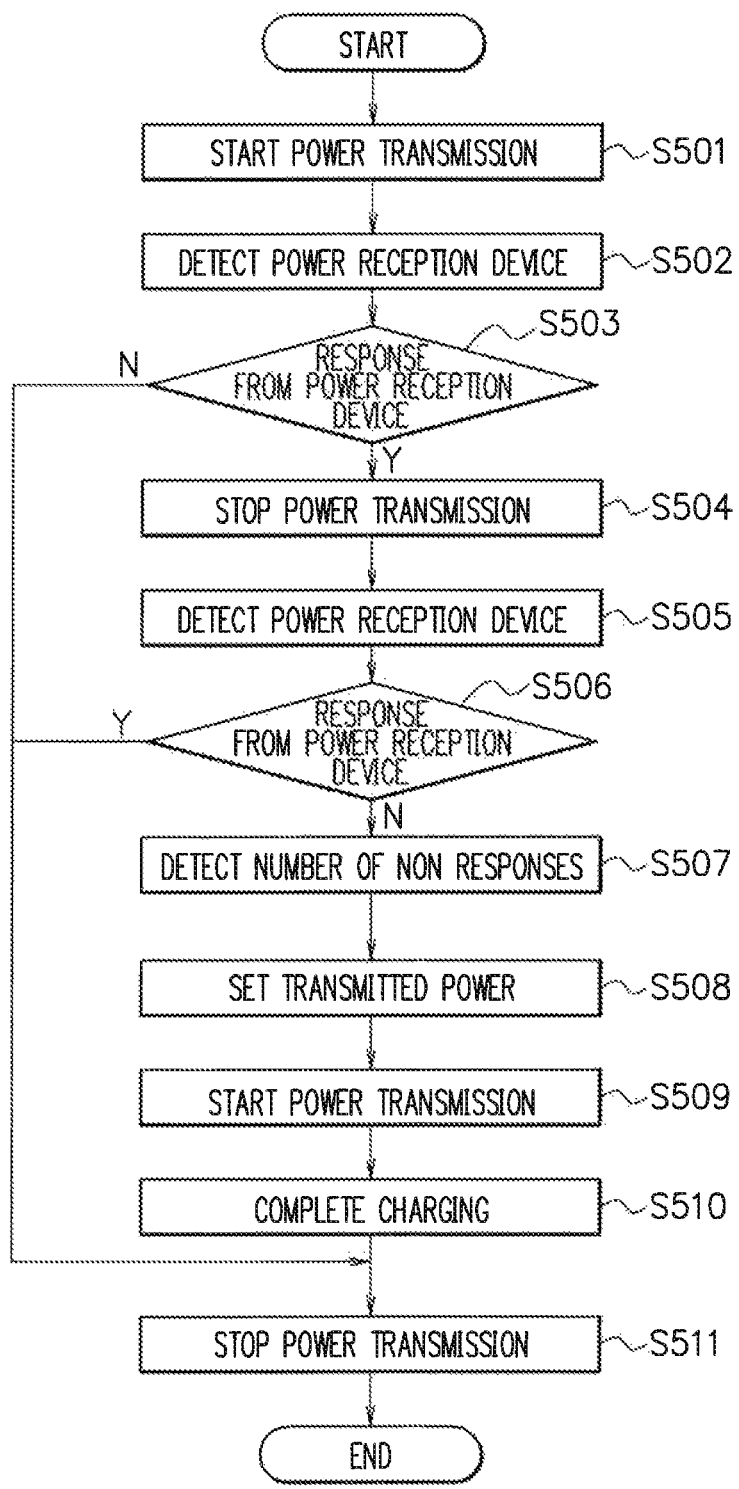
FIG. 5 is a flowchart illustrating a processing example of the second power transmission device.

FIG. 4A to FIG. 4C are diagrams for describing a method of detecting the number of power reception devices existing inside the power transmission possible range of the second power transmission device 101b, and FIG. 5 is a flowchart illustrating a processing example of the second power transmission device 101b. In FIG. 4A to FIG. 4C, a method will be described by which the second power transmission device 101b detects the number of power reception devices existing inside the second power transmission possible range 301b when the first power transmission device 101a performs power transmission to the first power reception device 102a. Note that the first power reception device 102a and the second power reception device 102b exist inside the second transmission possible range 302b of the second power transmission device 101b.

First, in step S501, as illustrated in FIG. 4A, by control of the power transmission control circuit 204, the power transmission unit (including the power transmission coil 202 and the power transmission LC resonator 203) of the second power transmission device 101b starts test power transmission by first power before regular power transmission is performed.

Next, in step S502, the second power transmission device 101b detects a power reception device receiving power during the test power transmission. Specifically, the communication unit 205 of the second power transmission device 101b transmits a power reception device detection notice for detecting the power reception device detection notice power. The second power reception device 102b exists inside the second power transmission possible range 301b of the second power transmission device 101b, and thus it receives power from the second power transmission device 101b. The communication unit 215 of the second power reception device 102b receives power equal to or more than a threshold, and thus upon receipt of the aforementioned power reception device detection notice from the second power transmission device 101b it transmits an indication of receiving power to the second power transmission device 101b.

On the other hand, the first power reception device 102a is located outside the second power transmission possible range 301b of the second power transmission device 101b, and thus it does not received power from the second power transmission device 101b but receives power from the first power transmission device 101a. Accordingly, also the communication unit 215 of the first power reception device 102a receives power equal to or more than the threshold, and thus upon receipt of the aforementioned power reception device detection notice from the second power transmission device 101b it transmits an indication of receiving power to the second power transmission device 101b.

Therefore, the second power transmission device 101b receives the indications of receiving power from the first power reception device 102a and the second power reception device 102b, and detects that the power reception devices receiving power are two power reception devices 102a and 102b.

Next, in step S503, the second power transmission device 101b proceeds to step S504 when it receives one or more indications of receiving power from the power reception devices, or when it receives no indication of receiving power from the power reception devices, no power reception device receiving power exists and thus it proceeds to step S511.

Next, in step S504, as illustrated in FIG. 4B, the power transmission unit (including the power transmission coil 202 and the power transmission LC resonator 203) of the second power transmission device 101b stops the aforementioned test power transmission by control of the power transmission control circuit 204, thereby changing it to a state of not performing power transmission.

Next, in step S505, the second power transmission device 101b detects the power reception devices receiving power after the test power transmission is stopped. Specifically, the communication unit 205 of the second power transmission device 101b transmits the power reception device detection notice for detecting a power reception device receiving power. The second power reception device 102b becomes a state of not receiving power and is not receiving power equal to or more than the threshold, and thus does not transmit the indication of receiving power when the aforementioned power reception device detection notice is transmitted.

On the other hand, the first power reception device 102a receives power from the first power transmission device 101a and receives power equal to or more than the threshold, and thus upon receipt of the aforementioned power reception device detection notice it transmits the indication of receiving power to the second power transmission device 101b.

Therefore, the second power transmission device 101b receives the indication of receiving power from only the first power reception device 102a, and detects that the power reception device receiving power is one power reception device 102a.

Next, the step S506, the second power transmission device 101b checks whether the number of power reception devices detected in step S502 and the number of power reception devices detected in step S505 are the same or not. When they are not the same, it proceeds to step S507, or when they are the same, it means that no power reception device receiving power exists inside the second power transmission possible range 301b of the second power transmission device 101b, and thus it proceeds to step S511.

Next, the step S507, as illustrated in FIG. 4C, the second power transmission device 101b subtracts the number of power reception devices from which there is a response in step S502 from the number of power reception devices from which there is a response in step S505, to thereby detect the number of power reception devices which changed to a state of no response. That is, by subtracting the number of power reception devices 102a detected in step S505, which is one, from the number of power reception devices 102a and 102b detected in step S502, which is two, the power transmission control circuit 204 of the second power transmission device 101b can detect that the number of power reception devices existing inside its own second power transmission possible range 301b is one, the second power reception device 102b.

Next, in steps S508 and S509, the power transmission unit (including the power transmission coil 202 and the power transmission LC resonator 203) of the second power transmission device 101b performs power transmission by appropriate power to the number of power reception devices 102b detected in step S507, which is one, by that the power transmission control circuit 204 controls gain of the amplifier in the high-frequency power supply circuit 201. Thus, appropriate power is transmitted from the second power transmission device 101b to the second power reception device 102b, which can prevent excessive power reception of the second power reception devices 102b and prevent abnormal heat generation.

Next, in step S510, when the communication unit 215 of the second power reception device 102b completes charging, it transmits a power reception completion notice to the second power transmission device 101b. Upon receipt of the power reception completion notice from the second power reception device 102b, the communication unit 205 of the second power transmission device 101b proceeds to step S511.

In step S511, the power transmission unit (including the power transmission coil 202 and the power transmission LC resonator 203) of the second power transmission device 101b stops power transmission by control of the power transmission control circuit 204.

The example of processing of the second power transmission device 101b has been described above, but processing of all the power transmission devices 101 including another power transmission device 101a is similar to the processing of the second power transmission device 101b.

As above, first, in step S502, the power transmission control circuit 204 of the power transmission device 101 detects the number of power reception devices 102 for which the communication unit 205 received the response indicating that power reception is performed for the power reception devices 102 receiving power equal to or more than the threshold when the power transmission unit performs power transmission by the first power. Thereafter, in step S505, the power transmission control circuit 204 of the power transmission device 101 detects the number of power reception devices 102 for which the communication unit 205 received the response indicating that power reception is performed from the power reception devices 102 receiving power equal to or more than the threshold when the power transmission unit does not perform power transmission. Thereafter in step S507, the power transmission control circuit 204 of the power transmission device 101 detects the number of power reception devices 102 existing inside the power transmission possible range of the power transmission unit according to the number of power reception devices 102 detected in step S502 and the number of power reception devices detected in step S505. Thereafter, in step S508, the power transmission control circuit 204 of the power transmission device 101 controls the power of wireless power transmission of the power transmission unit according to the number of power reception devices 102 detected in step S507.

Note that the order of the processing of steps S501 and S502 and the processing of steps S504 and S505 may be reversed. Specifically, the order may be such that first the processing of step S504 is performed, then the processing of step S505 is performed, then the processing of step S501 is performed, then the processing of step S502 is performed, and thereafter the processing of step S507 and so on is performed.

Specifically, first, as in step S505, the power transmission control circuit 204 of the power transmission device 101 detects the number of power reception devices 102 for which the communication unit 205 received the response indicating that power reception is performed from the power reception devices 102 receiving power equal to or more than the threshold when the power transmission unit does not perform power transmission. Thereafter, as in step S502, the power transmission control circuit 204 of the power transmission device 101 detects the number of power reception devices 102 for which the communication unit 205 received the response indicating that power reception is performed from the power reception devices 102 receiving power equal to or more than the threshold when the power transmission unit performs power transmission by the first power. Thereafter, in step S507, the power transmission control circuit 204 of the power transmission device 101 detects the number of power reception devices 102 existing inside the power transmission possible range of the power transmission unit according to the number of power reception devices 102 detected in step S502 and the number of power reception devices detected in step S505. Thereafter, in step S508, the power transmission control circuit 204 of the power transmission device 101 controls the power of wireless power transmission of the power transmission unit according to the number of the power reception devices 102 detected in step S507.

Further, in step S504, the example of stopping power transmission is described, but power transmission may be performed by second power (including minimum power) smaller than the first power of test transmission of step S501.

Specifically, in step S502, the power transmission control circuit 204 of the power transmission device 101 detects the number of power reception devices for which the communication unit 205 received the response indicating that power reception is performed from the power reception devices 102 receiving power equal to or more than the threshold when the power transmission unit performs power transmission by the first power. Further, similarly to steps S504 and S505, the power transmission control circuit 204 of the power transmission device 101 detects the number of power reception devices 102 for which the communication unit 205 received the response indicating that power reception is performed from the power reception devices 102 receiving power equal to or more than the threshold when the power transmission unit performs power transmission by the second power smaller than the first power. Thereafter, in step S508, the power transmission control circuit 204 of the power transmission device 101 controls the power of wireless power transmission of the power transmission unit according to the number of power reception devices detected in step S507. Also in this case, the order of the processing of steps S502 and S505 may be reversed as described above.

As described above, when the power reception devices 102 is a laptop personal computer, a mobile terminal, or the like, the power reception devices 102 are movable. According to this embodiment, when the number of the power reception devices 102 inside the power transmission possible range of the power transmission device 101 changes, the number of the power reception devices 102 inside its own power transmission possible range is detected, and wireless power transmission can be performed by appropriate power according to the number thereof.

Second Embodiment

Figure 6:
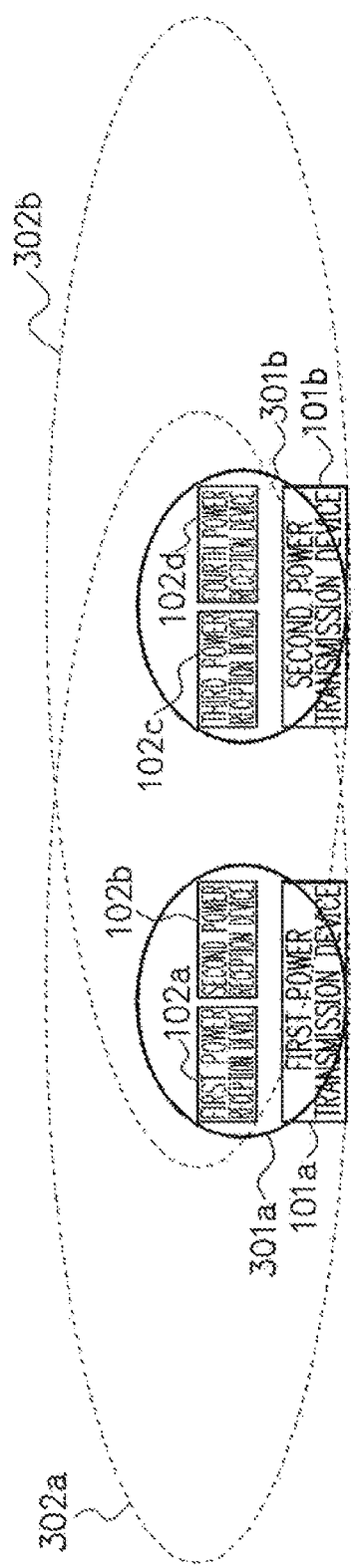
FIG. 6 is a diagram illustrating a structural example of a power transmission-reception system according to a second embodiment.
Figure 7:
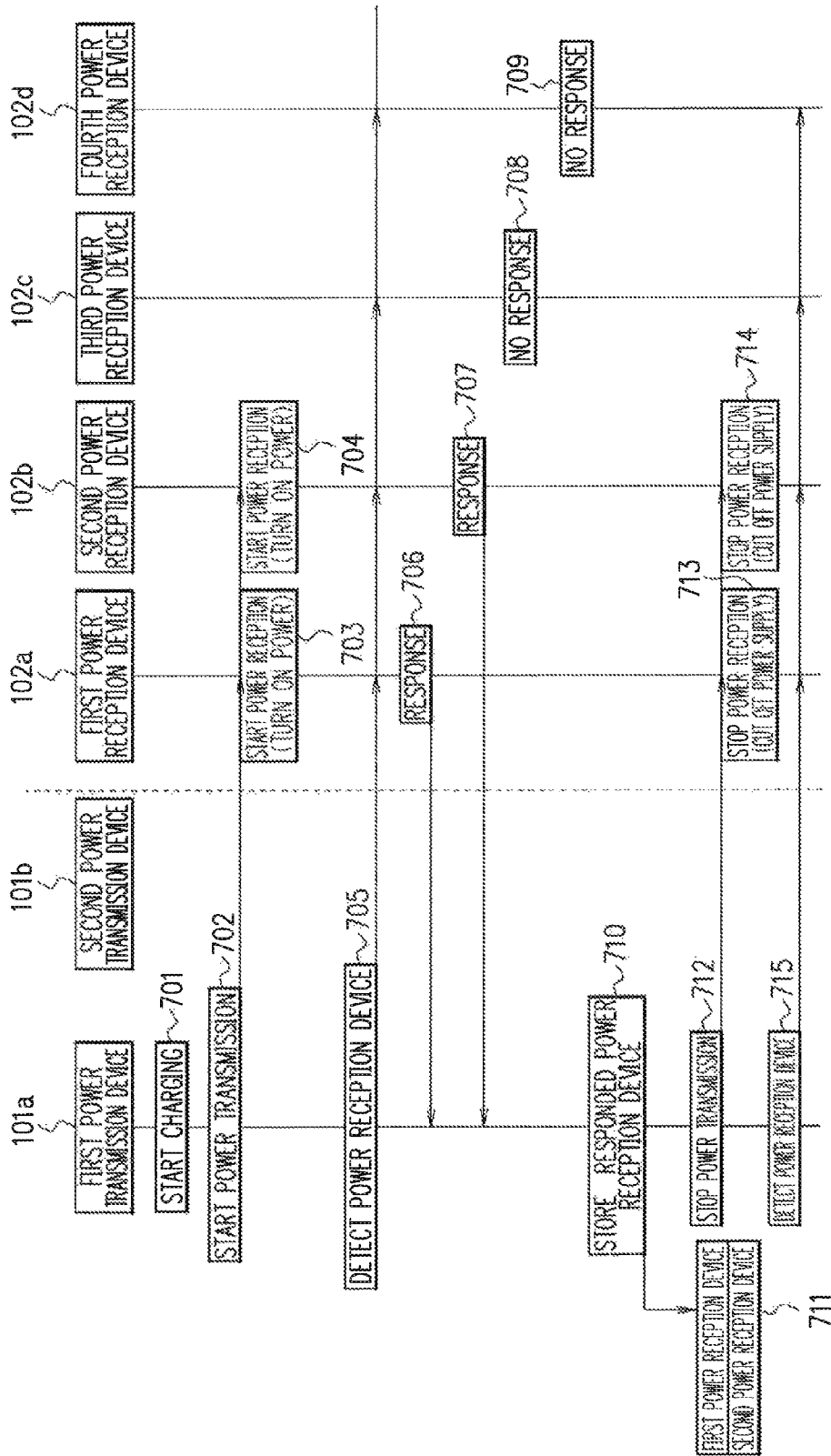
FIG. 7 is a sequence flow diagram illustrating a processing example of the power transmission-reception system of FIG. 6.

FIG. 6 is a diagram illustrating a structural example of a power transmission-reception system according to a second embodiment. The power transmission-reception system has two power transmission devices 101a, 101b and four power reception devices 102a, 102b, 102c, 102d. A first power transmission possible range 301a is a range in which a power transmission unit of the first power transmission device 101a can perform power transmission, and the first power reception device 102a and the second power reception device 102b exist. A second power transmission possible range 301b is a range in which a power transmission unit of the second power transmission device 101b can perform power transmission, and the third power reception device 102c and the fourth power reception device 102d exist.

The first transmission possible range 302a is a range in which the communication unit 205 of the first power transmission device 101a can perform transmission and is wider than the first power transmission possible range 301a, and the first power reception device 102a, the second power reception device 102b, the third power reception device 102c, and the fourth power reception device 102d exist therein. The second transmission possible range 302b is a range in which the communication unit 205 of the second power transmission device 101b can perform transmission and is wider than the second power transmission possible range 301b, and the first power reception device 102a, the second power reception device 102b, the third power reception device 102c, and the fourth power reception device 102d exist therein.

FIG. 7 to FIG. 10 are sequence flow diagrams illustrating a processing example of the power transmission-reception system of FIG. 6. First, in FIG. 7, in step 701, the first power transmission device 101a instructs a start of charge processing.

Next, in step 702, which corresponds to step S501 of FIG. 5, the power transmission unit of the first power transmission device 101a starts that power transmission by first power. Since the first power reception device 102a and the second power reception device 102b are located inside the first power transmission possible range 301a of the first power transmission device 101a, they start power reception from the first power transmission device 101a in steps 702 and 704, and their power is turned on by this power reception.

On the other hand, since the third power reception device 102c and the fourth power reception device 102d are located outside first power transmission possible range 301a of the first power transmission device 101a, they do not perform power reception and their power is not turned on.

Next, in step 705, which corresponds to step S502 of FIG. 5, the communication unit 205 of the first power transmission device 101a transmit a power reception device detection notice for detecting a power reception device receiving power.

Then, in step 706, since the first power reception device 102a is receiving power, upon receipt of the aforementioned power reception device detection notice from the first power transmission device 101a, it transmit an indication of receiving power as a response to the first power transmission device 101a. In step 708, since also the second power reception device 102b is receiving power, upon receipt of the aforementioned power reception device detection notice from the first power transmission device 101a, it transmits an indication of receiving power as a response to the first power transmission device 101a.

On the other hand, in step 708, since the third power reception device 102c is not receiving power, it does not respond when the aforementioned power reception device detection notice is transmitted. In step 709, since also the fourth power reception device 102d is not receiving power, it does not respond when the aforementioned power reception device detection notice is transmitted.

Next, in step 710, the power transmission control circuit 204 of the first power transmission device 101a stores in a storage unit 711 information of the first power reception device 102a and the second power reception device 102b from which there is a response in steps 706 and 708.

Next, in step 712, which corresponds to step S504 of FIG. 5, the power transmission unit of the first power transmission device 101a stops the test power transmission. Then, in step 713, the first power reception device 102a stops power reception and the power is cut off. In step 714, also the second power reception device 102b stops power reception and the power is cut off.

Next, in step 715, which corresponds to step S505 of FIG. 5, the communication unit 205 of the first power transmission device 101a transmits the power reception device detection notice for detecting a power reception device receiving power.

Figure 8:
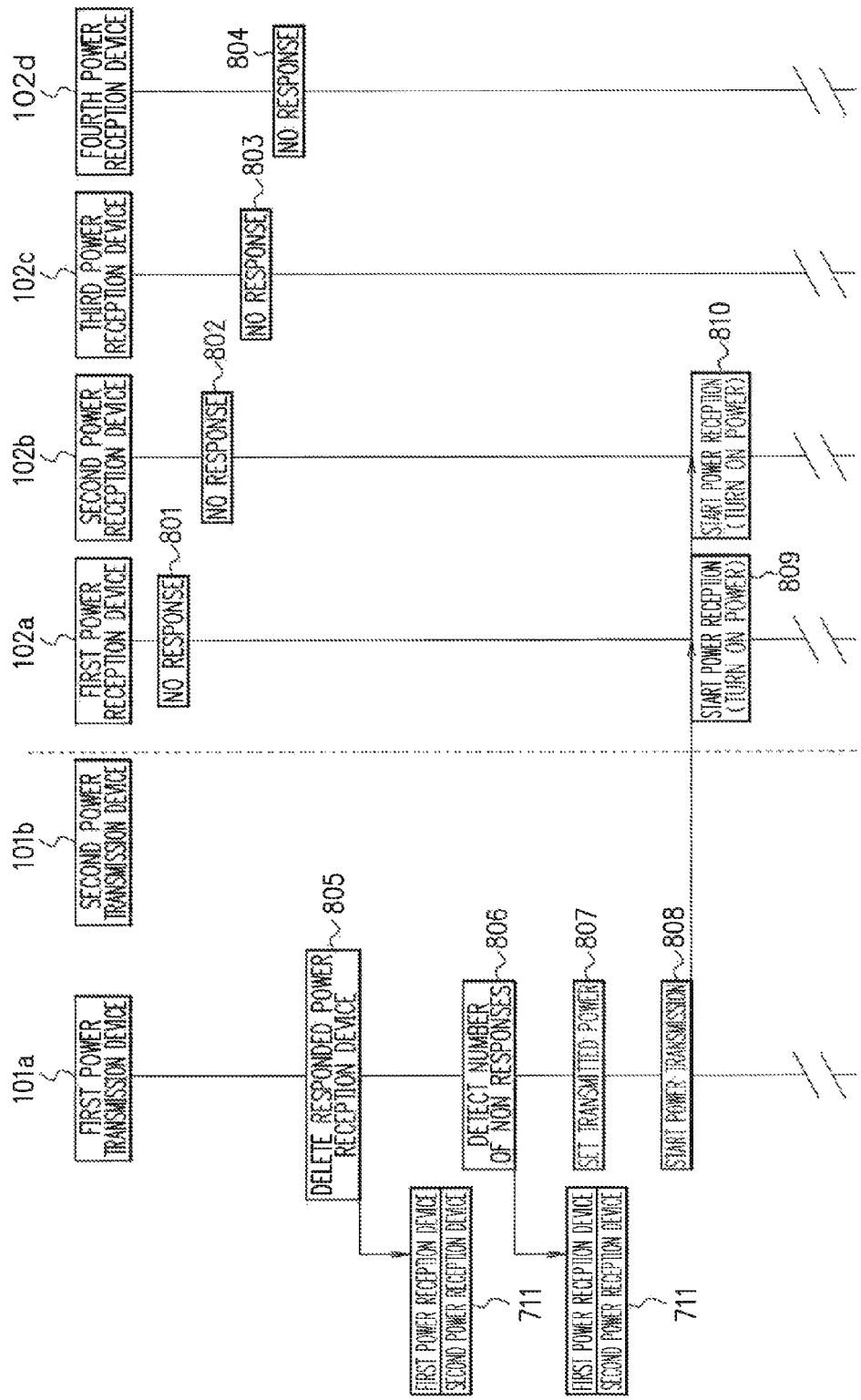
FIG. 8 is a sequence flow diagram illustrating a processing example of the power transmission-reception system of FIG. 6.

Then, as illustrated in FIG. 8, in step 801, since the first power reception device 102a is not receiving power, it does not respond when the aforementioned power reception device detection notice is transmitted. In step 802, since also the second power reception device 102b is not receiving power, it does not respond when the aforementioned power reception device detection notice is transmitted. In step 803, since also the third power reception device 102c is not receiving power, it does not respond when the aforementioned power reception device detection notice is transmitted. In step 804, also the fourth power reception device 102d is not receiving power, it does not respond when the aforementioned power reception device detection notice is transmitted.

Next, in step 805, the power transmission control circuit 204 of the first power transmission device 101a performs processing of deleting from the storage unit 711 information of power reception devices which responded. However, in step 805, since there exists no power reception device which responded, the power transmission control circuit 204 of the first power transmission device 101a does not delete the information of the storage unit 711.

Next, in step 806, which corresponds to step S507 of FIG. 5, the power transmission control circuit 204 of the first power transmission device 101a detects that two power reception devices, the first power reception device 102a and the second power reception device 102b, stored in the storage unit 711 exist in its own first power transmission possible range 301a.

Next, in step 807, which corresponds to step S508 of FIG. 5, the power transmission control circuit 204 of the first power transmission device 101a sets gain of the amplifier in the high-frequency power supply circuit 201 so that it becomes power appropriate for the number of power reception devices detected in step 806.

Next, in step 808, which corresponds to step S509 of FIG. 5, the power transmission unit of the first power transmission device 101a starts power transmission by the aforementioned set appropriate power. Then, in step 809, the first power reception device 102a received power by the appropriate power, and its power is turned on. In step 810, also the second power reception device 102b receives power by the appropriate power, and its power is turned on.

On the other hand, since the third power reception device 102c and the fourth power reception device 102d are located outside the first power transmission possible range 301a of the first power transmission device 101a, they do not receive power.

Figure 9:
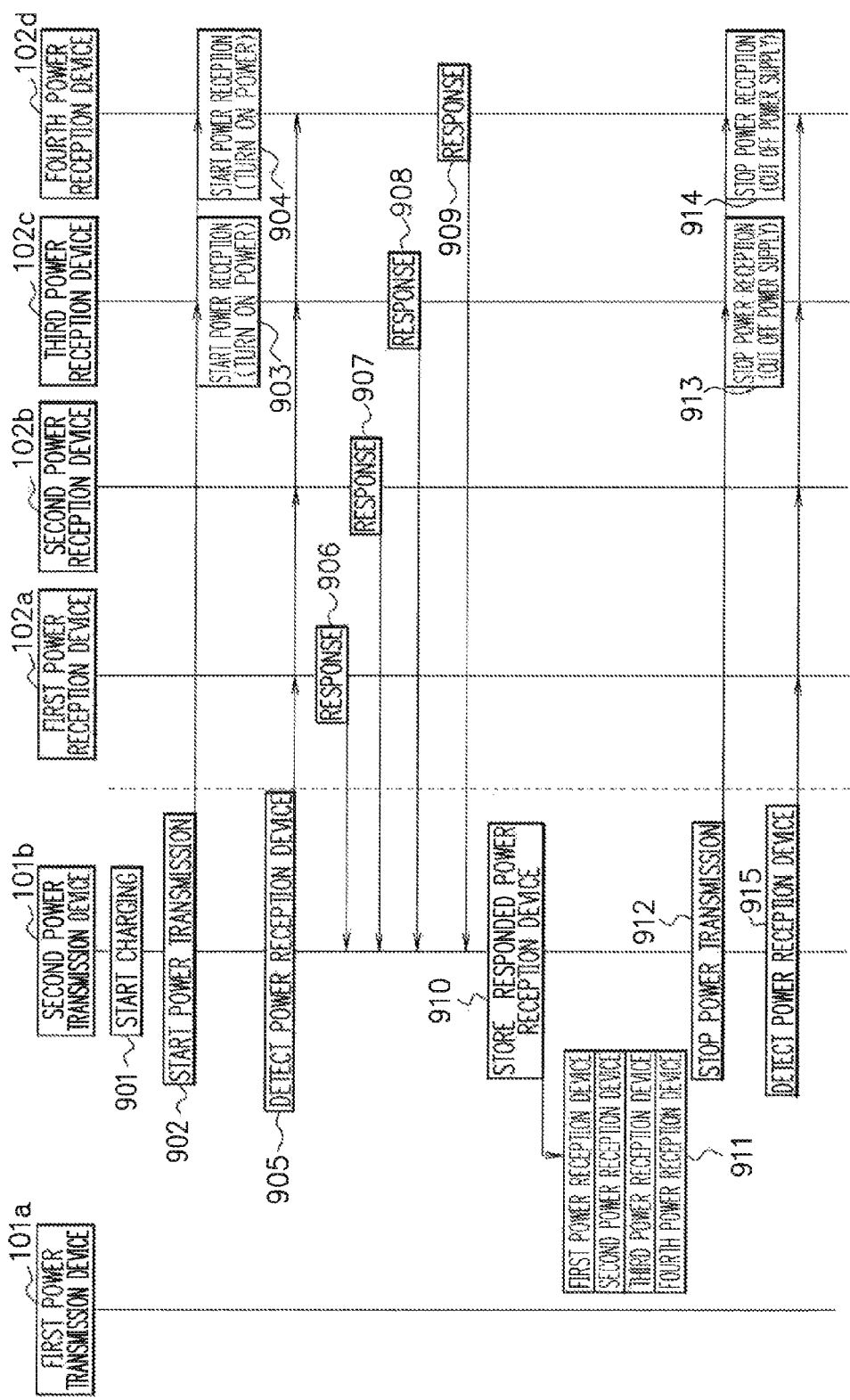
FIG. 9 is a sequence flow diagram illustrating a processing example of the power transmission-reception system of FIG. 6.

Next, as illustrated in FIG. 9, in step 901, the second power transmission device 101b instructs start of charge processing.

Next, in step 902, which corresponds to step S501 of FIG. 5, the power transmission unit of the second power transmission device 101b starts test transmission by the first power. Since the third power reception device 102c and the fourth power reception device 102d are located inside the second power transmission possible range 301b of the second power transmission device 101b, they start power reception from the second power transmission device 101b in steps 903 and 904, and power is turned on by this power reception.

Next, in step 905, which corresponds to step S502 in FIG. 5, the communication unit 205 of the second power transmission device 101b transmits the power reception device detection notice for detecting a power reception device receiving power.

Then, in step 906, since the first power reception device 102a is receiving power from the first power transmission device 101a, upon receipt of the aforementioned power reception device detection notice from the second power transmission device 101b, it transmits an indication of receiving power as a response to the second power transmission device 101b. In step 907, since also the second power reception device 102b is receiving power from the first power transmission device 101a, upon receipt of the aforementioned power reception device detection notice from the second power transmission device 101b, it transmits an indication of receiving power as a response to the second power transmission device 101b.

On the other hand, in step 908, since the third power reception device 102c is receiving power from the second power transmission device 101b, upon receipt of the aforementioned power reception device detection notice from the second power transmission device 101b, it transmits an indication of receiving power as a response to the second power transmission device 101b. In step 909, since also the fourth power reception device 102d is receiving power from the second power transmission device 101b, upon receipt of the aforementioned power reception device detection notice from the second power transmission device 101b, it transmits an indication of receiving power as a response to the second power transmission device 101b.

Next, in step 901, the power transmission control circuit 204 of the second power transmission device 101b storms in a storage unit 911 information of the first power reception device 102a to the fourth power reception device 102d from which there is a response in steps 906 to 909.

Next, in step 931, which corresponds to step S504 of FIG. 5, the power transmission unit of the second power transmission device 101b stops test power transmission. Then, in step 913, the third power reception device 102c steps power reception, and the power is cut off. In step 914, also the fourth power reception device 102d stops power reception, and the power is cut off.

Then, in step 915, which corresponds to step S505 of FIG. 5, the communication unit 205 of the second power transmission device 101b transmits the power reception device detection notice for detecting a power reception device receiving power.

Figure 10:
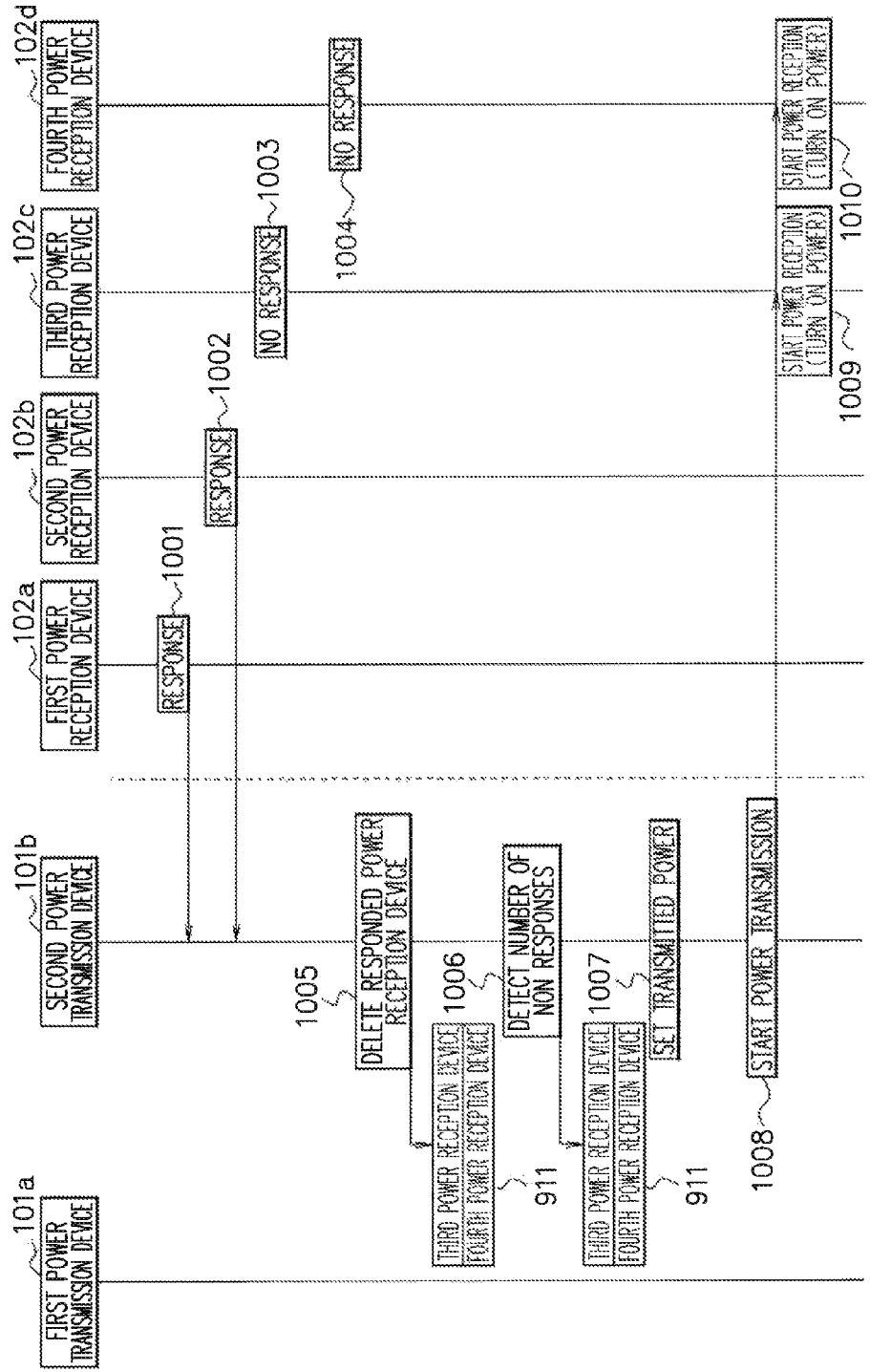
FIG. 10 is a sequence flow diagram illustrating a processing example of the power transmission-reception system of FIG. 6.

Then, as illustrated in FIG. 10, in step 1001, since the first power reception device 102a is receiving power from the first power transmission device 101a, upon receipt of the aforementioned power reception device detection notice from the second power transmission device 101b, it transmits an indication of receiving power as a response to the second power transmission device 101b. In step 1002, since also the second power reception device 102b is receiving power from the first power transmission device 101a, upon receipt of the aforementioned power reception device detection notice from the second power transmission device 101b, it transmits an indication of receiving power as a response to the second power transmission device 101b.

On the other hand, in step 1003, since the third power reception device 102c is not receiving power, it does not respond upon receipt of the aforementioned power reception device detection notice. In step 1004, since also the fourth power reception device 102d is not receiving power, it does not respond when the aforementioned power reception device detection notice is transmitted.

Next, in step 1005, the power transmission control circuit 204 of the second power transmission device 101b deletes information of the first power reception device 102a and the second power reception device 102b which responded in steps 1001 and 1002 from the storage unit 911. Thus, information of the third power reception device 102c and the fourth power reception device 102d remains in the storage unit 911.

Next, in step 1006, which corresponds to step S507 of FIG. 5, the power transmission control circuit 204 of the second power transmission device 101b detects that two power reception devices, the third power reception device 102c and the fourth power reception device 102d stored in the storage unit 911, exist in its own second power transmission possible range 301b.

Next, in step 1007, which corresponds to step S508 of FIG. 5, the power transmission control circuit 204 of the second power transmission device 101b sets gain of the amplifier in the high-frequency power supply circuit 201 so that it becomes power appropriate for the number of power reception devices detected in step 1006.

Next, in step 1008, which corresponds to step S509 of FIG. 5, the power transmission unit of the second power transmission device 101b starts power transmission by the aforementioned set appropriate power. Then in step 1009, the third power reception device 102c receives power by the appropriate power, and its power is turned on. In step 1010, also the fourth power reception device 102d receives power by the appropriate power, and its power is turned on.

As described above, according to this embodiment, the first power transmission device 101a can perform power transmission by power appropriate for the two power reception devices 102a and 102b inside the first power transmission possible range 301a. The second power transmission device 101b can perform power transmission by power appropriate for the two power reception devices 102c and 102d inside the second power transmission possible range 301b.

Third Embodiment

FIG. 11 is a time chart illustrating a power transmission example of the first power transmission device 101a according to a third embodiment. Differences of this embodiment from the first and second embodiments will be described below. The first power transmission device 101a regularly performs the processing of steps S501 to S509 of FIG. 5 at certain cycles. Thus, as illustrated in FIG. 11, in the first power transmission device 101a, the power transmission stoppage of step S504 is performed regularly.

Specifically, the power transmission control circuit 204 of the first power transmission device 101a regularly performs the processing of controlling the power of wireless power transmission of the power transmission unit in step S508 according to the number of power reception devices 102 received by the communication unit 205 in step S502 when the power transmission unit performs power transmission by first power in step S501 and the number of power reception devices 102 received by the communication unit 205 in step S505 when the power transmission unit does not perform power transmission in step S504.

It can be expected that the power reception device 102 is moved or increased in number while being charged. In this embodiment, the first power transmission device 101a regularly detects the number of power reception devices 102 existing inside the first power transmission possible range 301a and controls the transmitted power, and thus when the number of power reception devices 102 inside the first power transmission possible range 301a changes, power transmission can be performed by appropriate power.

Note that when the first power transmission device 101a and the second power transmission device 101b which are contingently located closely starts charging processing simultaneously, if the first power transmission device 101a and the second power transmission device 101b perform the aforementioned power control processing regularly at the same cycles, the first power transmission device 101a erroneously detects that the first power reception device 102a to the fourth power reception device 102d exist inside the first power transmission possible range 301a, and also the second power transmission device 101b erroneously detects that the first power reception device 102a to the fourth power reception device 102d exist in the second power transmission possible range 301b. Accordingly, an embodiment which can respond to such contingent cases will be described in a fourth embodiment below.

Fourth Embodiment

FIG. 12 is a time chart illustrating a power transmission example of the first power transmission device 101a and the second power transmission device 101b according to a fourth embodiment. Differences of this embodiment from the third embodiment will be described below. The second power transmission device 101b regularly performs the processing of steps S501 to S509 of FIG. 5 at certain cycles similarly in the first power transmission device 101a of the third embodiment. Thus, as illustrated in FIG. 12, in the second power transmission device 101b, the power transmission stoppage of step S504 is performed regularly at certain cycles.

On the other hand, the first power transmission device 101a performs the processing of steps S501 to S509 of FIG. 5 plural times at random cycles. Thus, as illustrated in FIG. 12, in the first power transmission device 101a, the power transmission stoppage of step S504 is performed plural times at random cycles.

That is, the power transmission control circuit 204 of the first power transmission device 101a performs, plural times at random cycles, the processing of controlling the power of wireless power transmission of the power transmission unit in step S508 according to the number of power reception devices 102 received by the communication unit 205 in step S502 when the power transmission unit performs power transmission by first power in step S501 and the number of power reception devices 102 received by the communication unit 205 in step S505 when the power transmission unit does not perform power transmission in step S504.

According to this embodiment, even when the first power transmission device 101a and the second power transmission device 101b which are contingently located closely start the charging processing simultaneously, the first power transmission device 101a and the second power transmission device 101b can perform correct power control because they perform the power transmission control processing of the second time and so on at different timings. Specifically, the first power transmission device 101a performs correct detection when the first power reception device 102a and the second power reception device 102b exist inside the first power transmission possible range 301a, and also the second power transmission device 101b performs correct detection when the third power reception device 102c and the fourth power reception device 102d exist inside the second power transmission possible range 301b, thereby making it possible to perform transmission by appropriate power.

Fifth Embodiment

FIG. 13A, FIG. 13B, FIG. 14A, and FIG. 14B are diagrams illustrating a processing example of the first power transmission device 101a and the second power transmission device 101b according to a fifth embodiment.

In FIG. 13A, the first power transmission device 101a is located outside the second transmission possible range 302b of the second power transmission device 101b, and the second power transmission device 101b is located outside the first transmission possible range 302a of the first power transmission device 101a.

When the communication unit 205 of the first power transmission device 101a transmits a power transmission device detection notice, since the second power transmission device 101b does not exist inside the first transmission possible range 302a, the communication unit 205 of the second power transmission device 101b is unable to receive the power transmission device detection notice from the first power transmission device 101a, and hence does not respond thereto. Since the communication unit 205 does not receive the aforementioned response, the power transmission control circuit 204 of the first power transmission device 101a can detect that the second power transmission device 101b does not exist in the first transmission possible range 302a.

Similarly, when the communication unit 205 of the second power transmission device 101b transmits the power transmission device detection notice, since the first power transmission device 101a does not exist in the second transmission possible range 302b, the communication unit 205 of the first power transmission device 101a is unable to receive the power transmission device detection notice from the second power transmission device 101b, and hence does not respond thereto. Since the communication unit 205 does not receive the aforementioned response, the power transmission control circuit 204 of the second power transmission device 101b can detect that the first power transmission device 101a does not exist in the second transmission possible range 302b.

Figure 13B:
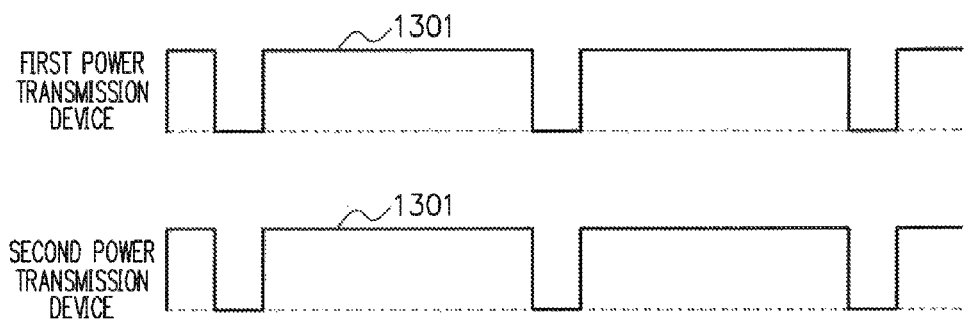
FIG. 13B is a diagram illustrating a processing example of the first power transmission device and the second power transmission device according to the fifth embodiment.

FIG. 13B is a time chart illustrating a power transmission example of the first power transmission device 101a and the second power transmission device 101b in the state of FIG. 13A. In the case of FIG. 13A, the first power transmission device 101a does not exist inside the second transmission possible range 302b and thus of course does not exist inside the second power transmission possible range 301b. Similarly, the second power transmission device 101b does not exist inside the first transmission possible range 302a and thus of course does not exist inside the first power transmission possible range 301a.

In this case, the first power transmission device 101a and the second power transmission device 101b regularly perform power control processing similarly to FIG. 11, and thus periodic power transmission 1301 is performed. Since the first power transmission device 101a and the second power transmission device 101b are separated from each other, they can perform correct power control processing even when they perform the power control processing at the same timing.

Figure 14A:
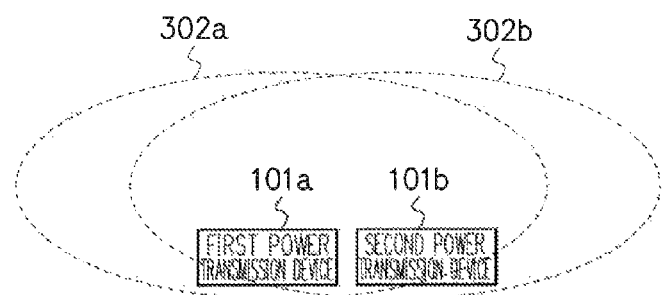
FIG. 14A is a diagram illustrating a processing example of the first power transmission device and the second power transmission device according to a fifth embodiment.

In FIG. 14A, the first power transmission device 101a is located inside the second transmission possible range 302b of the second power transmission device 101b, and the second power transmission device 101b is located inside the first transmission possible range 302a of the first power transmission device 101a.

When the communication unit 205 of the first power transmission device 101a transmits the power transmission device detection notice, since the second power transmission device 101b exists inside the first transmission possible range 302a, the communication nit 205 of the second power transmission device 101b receives the power transmission device detection notice from the first power transmission device 101a, and transmits a response thereof. The communication unit 205 receives the aforementioned response, and thus the power transmission control circuit 204 of the first power transmission device 101a can detect that the second power transmission device 101b exists inside the first transmission possible range 302a.

Similarly, when the communication unit 205 of the second power transmission device 101b transmits the power transmission device detection notice, since the first power transmission device 101a exists inside the second transmission possible range 302b, the communication unit 205 of the first power transmission device 101a receives the power transmission device detection notice from the second power transmission device 101b, and transmits a response thereof. The communication unit 205 receives the aforementioned response, and thus the power transmission control circuit 204 of the second power transmission device 101b can detect that the first power transmission device 101a exists inside the second transmission possible range 302b.

Figure 14B:
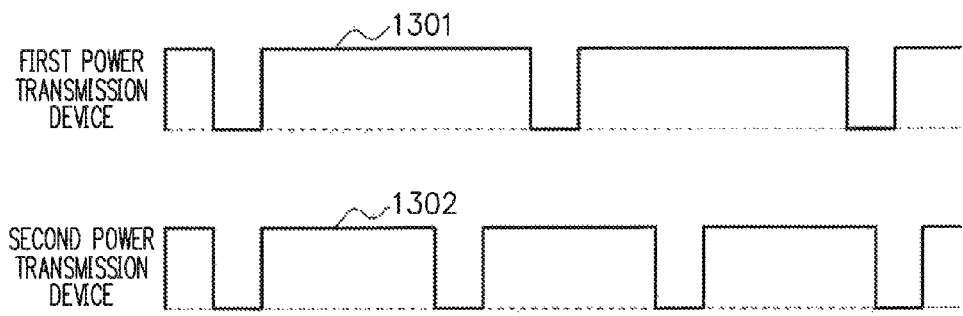
FIG. 14B is a diagram illustrating a processing example of the first power transmission device and the second power transmission device according to the fifth embodiment.

FIG. 14B is a time chart illustrating a power transmission example of the first power transmission device 101a and the second power transmission device 101b in the state of FIG. 14A. In the case of FIG. 14A, the first power transmission device 101a exists inside the second transmission possible range 302b and thus there is a possibility that it also exists inside the second power transmission possible range 301b. Similarly, the second power transmission device 101b exists inside the first transmission possible range 302a and thus there is a possibility that it also exists inside the first power transmission possible range 301a.

In this case, the first power transmission device 101a periodically performs the power control processing at first cycles similarly to FIG. 11, and thus periodic power transmission 1301 at the first cycles is performed. The second power transmission device 101b periodically performs the power control processing at second cycles different from the first cycles similarly to FIG. 11, and thus periodic power transmission 1302 at the second cycles is performed.

Specifically, when the communication unit 205 receives an indication of existence of another power transmission device 101 inside the transmission possible range of the communication unit 205, the power transmission control circuit 204 of the power transmission device 101 makes the cycles of the regularly performed power transmission control processing be different from the power transmission control processing regularly performed by the aforementioned other power transmission device 101.

Since the first power transmission device 101a and the second power transmission device 101b are located close to each other, timings of at least the second power control processing and thereafter are shifted by making the cycles of performing the processing periodically be different, thereby making it possible to perform correct power control processing.

According to the first to fifth embodiments, the power transmission device 101 can detect the number of power reception devices 102 existing inside the power transmission possible range, and perform wireless power transmission by appropriate power according to this number. Thus, it is possible to prevent a problem that the power transmission device 101 transmits excessive power and abnormal heating occurs in the power reception device 102, and thereby prevent unnecessary power transmission loss.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

The number of power reception devices inside a power transmission possible range can be detected, and wireless power transmission can be performed by appropriate power according to this number.

All examples and conditional language provided herein are intended for the pedagogical purposes of siding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. A power transmission device, comprising:
   a power transmission unit configured to perform wireless power transmission;
   a communication unit configured to perform wireless communication within a range wider than a power transmission possible range of the power transmission unit; and
   a power transmission control circuit configured to control power of wireless power transmission of the power transmission unit, wherein
   the power transmission control circuit detects a first number of power reception devices for which the communication unit received a response indicating that power reception is performed from power reception devices receiving power equal to or more than a threshold from the power transmission device or other power transmission device when the power transmission unit performs power transmission by first power, and a second number of power reception devices for which the communication unit received a response indicating that power reception is performed from power reception devices receiving power equal to or more than the threshold from the other power transmission device when the power transmission unit does not perform power transmission or performs power transmission by second power smaller than the first power; obtains a number of the power reception devices receiving power equal to or more than the threshold from the power transmission device by subtracting the second number of the power reception devices from the first number of the power reception devices; and controls the power of wireless power transmission of the power transmission unit according to the number of the power reception devices receiving power equal to or more than the threshold from the power transmission device.

2. The power transmission device according to claim 1, wherein the power transmission control circuit detects a number of power reception devices existing in the power transmission possible range of the power transmission unit according to the number of power reception devices for which the communication unit received a response indicating that power reception is performed from power reception devices receiving power equal to or more than the threshold when the power transmission unit performs power transmission by the first power, and the number of power reception devices for which the communication unit received a response indicating that power reception is performed from power reception devices receiving power equal to or more than the threshold when the power transmission unit does not perform power transmission or performs power transmission by the second power, and controls the power of wireless power transmission of the power transmission unit according to the number of detected power reception devices.

3. The power transmission device according to claim 1, wherein the power transmission control circuit controls the power of wireless power transmission of the power transmission unit according to the number of power reception devices for which the communication unit received a response indicating that power reception is performed from power reception devices receiving power equal to or more than the threshold when the power transmission unit performs power transmission by the first power, and the number of power reception devices for which the communication unit received a response indicating that power reception is performed from power reception devices receiving power equal to or more than the threshold when the power transmission unit does not perform power transmission.

4. The power transmission device according to claim 1, wherein the power transmission control circuit controls the power of wireless power transmission of the power transmission unit according to the number of power reception devices for which the communication unit received a response indicating that power reception is performed from power reception devices receiving power equal to or more than the threshold when the power transmission unit performs power transmission by the first power, and the number of power reception devices for which the communication unit received a response indicating that power reception is performed from power reception devices receiving power equal to or more than the threshold when the power transmission unit performs power transmission by the second power.

5. The power transmission device according to claim 1, wherein the power transmission control circuit first detects the number of power reception devices for which the communication unit received a response indicating that power reception is performed from power reception devices receiving power equal to or more than the threshold when the power transmission unit performs power transmission by the first power, thereafter detects the number of power reception devices for which the communication unit received a response indicating that power reception is performed from power reception devices receiving power equal to or more than the threshold when the power transmission unit does not perform power transmission or performs power transmission by the second power, and controls the power of wireless power transmission of the power transmission unit according to a result of the detection.

6. The power transmission device according to claim 1, wherein the power transmission control circuit first detects the number of power reception devices for which the communication unit received a response indicating that power reception is performed from power reception devices receiving power equal to or more than the threshold when the power transmission unit does not perform power transmission or performs power transmission by the second power, thereafter detects the number of power reception devices for which the communication unit received a response indicating that power reception is performed from power reception devices receiving power equal to or more than the threshold when the power transmission unit performs power transmission by the first power, and controls the power of wireless power transmission of the power transmission unit according to a result of the detection.

7. The power transmission device according to claim 1, wherein the power transmission control circuit regularly performs processing to control the power of wireless power transmission of the power transmission unit according to the number of power reception devices received by the communication unit when the power transmission unit performs power transmission by the first power, and the number of power reception devices received by the communication unit when the power transmission unit does not perform power transmission or performs power transmission by the second power.

8. The power transmission device according to claim 1, wherein the power transmission control circuit performs, several times at random cycles, processing to control the power of wireless power transmission of the power transmission unit according to the number of power reception devices received by the communication unit when the power transmission unit performs power transmission by the first power, and the number of power reception devices received by the communication unit when the power transmission unit does not perform power transmission or performs power transmission by the second power.

9. The power transmission device according to claim 7, wherein when the communication unit receives an indication of existence of another power transmission device inside the transmission possible range of the communication unit, the power transmission control circuit makes the cycles of the periodically performed processing be different from cycles of processing periodically performed by the other power transmission device.

10. A power transmission-reception system, comprising:
a power transmission device; and
a power reception device, wherein
the power transmission device comprises:
a power transmission unit configured to perform wireless power transmission;
a communication unit configured to perform wireless communication within a range wider than a power transmission possible range of the power transmission unit; and
a power transmission control circuit configured to control the power of wireless power transmission of the power transmission unit, wherein
the power transmission control circuit controls the power of wireless power transmission of the power transmission unit according to a number of power reception devices for which the communication unit received a response indicating that power reception is performed from power reception devices receiving power equal to or more than a threshold when the power transmission unit performs power transmission by first power, and a number of power reception devices for which the communication unit received a response indicating that power reception is performed from power reception devices receiving power equal to or more than the threshold when the power transmission unit does not perform power transmission or performs power transmission by second power smaller than the first power, and
the power reception device has a communication unit transmitting to the power transmission device an indication of receiving power when power equal to or more than the threshold is received.

* * * * *